United States Patent
Jamieson

(10) Patent No.: US 7,383,172 B1
(45) Date of Patent: Jun. 3, 2008

(54) PROCESS AND SYSTEM FOR SEMANTICALLY RECOGNIZING, CORRECTING, AND SUGGESTING DOMAIN SPECIFIC SPEECH

(76) Inventor: Patrick William Jamieson, 10172 Parkshore Dr., Noblesville, IN (US) 46060

(*) Notice: Subject to any disclaimer, the term of this patent is extended or adjusted under 35 U.S.C. 154(b) by 737 days.

(21) Appl. No.: 10/914,532

(22) Filed: Aug. 9, 2004

Related U.S. Application Data

(60) Provisional application No. 60/495,483, filed on Aug. 15, 2003.

(51) Int. Cl.
*G06F 17/27* (2006.01)
(52) U.S. Cl. .......................................... 704/9
(58) Field of Classification Search ............... 704/9
See application file for complete search history.

(56) References Cited

U.S. PATENT DOCUMENTS

| | | | |
|---|---|---|---|
| 5,991,721 A | 11/1999 | Asano et al. | |
| 6,006,183 A | 12/1999 | Lai et al. | |
| 6,519,562 B1* | 2/2003 | Phillips et al. | 704/240 |
| 6,523,004 B1 | 2/2003 | Vanbuskirk et al. | |
| 6,523,026 B1* | 2/2003 | Gillis | 707/3 |
| 6,532,444 B1 | 3/2003 | Weber | |
| 6,567,778 B1 | 5/2003 | Chao Chang et al. | |
| 2001/0041978 A1 | 11/2001 | Crespo et al. | |
| 2002/0111803 A1 | 8/2002 | Romero | |
| 2002/0178005 A1* | 11/2002 | Dusan et al. | 704/254 |

OTHER PUBLICATIONS

Kanai KM, Hangiandreou NJ, Sykes AM, Eklund HE, et al. The Evaluation of the Accuracy of Continuous Speech Recognition Software System in Radiology. Journal of Digital Imagining vol. 13 (2), Supplement 1:211-212. May 2000.

Al-Aynati MM, Chorneyko KA. Comparison of voice-automated transcription and human transcription in generating pathology reports. Arch Pathol Lab Med. Jun. 2003;127(6):721-5.

* cited by examiner

*Primary Examiner*—David R. Hudspeth
*Assistant Examiner*—Josiah Hernandez

(57) ABSTRACT

Semantic understanding of hypotheses returned by a speech engine could improve the quality of recognition and in cases of misrecognition speed the identification of errors and potential substitutions. Unfortunately, semantic recognition using natural language parsers is hard since semantic and syntactic rules for processing language are complex and computationally expensive. Additionally, semantic recognition should be performed in a knowledge domain—a domain of interest such as radiology, pathology, or tort law. This adds additional complexity to building semantic rules. The method described achieves semantic understanding by coupling a speech recognition engine to a semantic recognizer, which draws from a database of domain sentences derived from a document corpus, and a knowledge base created for these domain sentences. The method is able to identify in near real-time the best sentence hypotheses from the speech recognizer and its associated meanings, i.e. propositions, which belong to the knowledge domain, and if no hypotheses are found mark it as invalid for easy identification. For invalid sentences, closely matched sentences from the domain database can be displayed to speed correction. The semantic propositions can be semantically typed, such as normal and abnormal, further aiding in the identification of recognition errors. The system automatically displays the semantic meaning of related ideas of valid sentences by retrieving proposition (s) from the knowledge base.

13 Claims, 4 Drawing Sheets

Fig. 4

PROCESS AND SYSTEM FOR SEMANTICALLY RECOGNIZING, CORRECTING, AND SUGGESTING DOMAIN SPECIFIC SPEECH

CROSS REFERENCE TO RELATED APPLICATIONS

This application claims benefit of U.S. Provisional Application Ser. No. 60/495,483, titled "Method and System for Semantically Recognizing and Correcting Domain Specific Speech", filed on Aug. 15, 2003, incorporated by reference. This application references application Ser. No. 10/844,912 titled, "Process for constructing a semantic knowledge base using a document corpus", filed on May 13, 2004, also incorporated by reference.

BACKGROUND OF INVENTION

The present invention relates to a method and system for processing spoken language; more specifically using semantic recognition methods for determining when a spoken utterance is part of a knowledge domain, correcting incorrect or incorrectly recognized utterances, and suggesting context specific related domain sentences.

Speech recognition is a process in which an acoustic signal is converted to words and symbols by a computer. Nearly all speech recognizers use Hidden Markov Models (HMMs) to identify the most likely string of words in an utterance. HMMs are statistical models that associate spoken words with structural acoustic features found in speech signals. This association is made in part by training with speech data. HMMs also use word-level models with co-occurrence frequency information to improve recognition accuracy. Algorithms, such as Viterbi beam search, direct the search for likely word strings using these models. While this technique is accurate to a point, it is only able to produce statistical word string hypotheses, because these statistical models are inadequate for representing the semantic structure of an utterance. Yet, semantic information is central to understanding when an utterance is part of a domain of knowledge, and if not suggesting a meaningful correction. With semantic analysis, a speech recognition system can anticipate and suggest to the user other sentences they may wish to speak in a specific context. Semantic understanding also offers a valuable dimension to processing speech, making it useful for decision support, automatic summarization, and coding. While the utility of semantic understanding is widely acknowledged in the speech community, the development of semantic recognition algorithms is difficult.

Some have tried to use methods in natural language processing (nip) to extract semantic information. Speech recognition systems that employ nip are less common than pure statistically driven recognizers, and normally function as a sequential stage after statistical word recognition. Often the goal has been to process information for queries or commands spoken by users (Romero, Method and system for semantic speech recognition, U.S. patent application 20020111803), and (Vanbuskirk, Method and apparatus for disambiguating lists of elements for speech interfaces, U.S. Pat. No. 6,523,004).

Most nip systems use parsers, which employ grammar rules to identify phrases in a text string, and then use slot-filler logic to extract a semantic item. For example, a system might have a rule R1=<SUBJ><is normal> that when applied to the input string "The heart is normal" creates the output <SUBJ=heart> and semantically fills a slot such as Appearance: (Normal heart). A key problem with this type of semantic extraction is defining the relevant concepts in a circumscribed area of knowledge—a domain. Few tools and methods are available for systematically categorizing domain knowledge, especially for medium to large scale domains. Knowledge engineers often spend months creating even modest knowledge-bases. Without a semantic knowledge-base, a parser cannot successfully extract the knowledge of interest.

Parsers employed in conjunction with speech recognition are usually given the speech recognizer's top hypothesis after the initial recognition step. Chang and Jackson (U.S. Pat. No. 6,567,778) improved the confidence score for the top hypothesis generated by a speech recognizer by using a parser to determine whether to accept the words used in certain semantic slots. If the slot was rejected, their program could request the user to repeat only the information necessary to fill that slot, rather than requiring the user to repeat the entire stream of input speech. Weber (U.S. Pat. No. 6,532,444) used a similar approach to semantic speech processing, additionally providing a backup grammar file of general rules if context specific processing failed. One problem with parsers is high computational costs. While speech processing continues to increase in speed, natural language parsers operate in $O(N)^3$ time, where n equals the number of word tokens, and thus are not suitable for interactive speech processing except for very short sentences.

Few have used nip techniques to guide the search of different word string hypotheses by the speech recognizer itself because of the computational complexity. In Crespo (U.S. patent application 20010041978), a method was described that used nip to restrict searching to an N-best list of salient words using grammar rules. In Asano et. al. (U.S. Pat. No. 5,991,721) actual language examples were used instead grammar rules. The speech recognizer's hypotheses were compared to these examples using a similarity metric to each of the individual words supplemented by a thesaurus. The best match was then used as the top rated hypothesis. While this method assures some similarity between the input words and actual words in example database, it cannot guarantee that the semantic meaning of the entire sentence is equivalent. Asano also does not describe methods for creating the example database. Considering the complexity and expressiveness of language, creating a good example database is a major obstacle to using his method in even a medium size knowledge domain.

While these approaches offer improvements for processing speech, they do not answer the question of whether an utterance is semantically valid in a particular knowledge domain. For example, the sentence, "The patient's heart is red", is a syntactically and semantically valid English sentence. However, this is not something that would be usually said in the domain of radiology. Currently, no parsers exists that would flag such out of domain sentences except in very simple domains. State of the art speech recognition systems often employ context free grammar (CFG) rules which can be programmed to allow or disallow certain utterances. These rules are only employed for small scale domains since the cost and complexity of building CFGs for large scale domains such as radiology is impractical.

An important unmet need for semantically driven speech recognition in medium to large scale domains exists not only because it can help with identification of misrecognized utterances, but because it can increase the confidence that the speech recognizer accurately identified an utterance in a given knowledge domain.

Users dictating text with speech recognition find that errors are hard to detect. For example, researchers from the departments of radiology at the University of Washington in Seattle and the Mayo Clinic in Rochester, Minn., evaluated the performance of a single continuous speech recognition software product (IBM MedSpeak T/Radiology, version 1.1) among radiologists. The overall error rate of the transcribed reports was 10.3%. The rate of significant errors (class 2 or 3) was 7.8%, with an average of 7 significant errors per 87-word report. Subtle significant errors (class 3) were found in 1.2% of cases, or on average, about 1 error per 87-word report [Kanai K M, Hangiandreou N J, Sykes A M, Eklund H E, et al. The Evaluation of the Accuracy of Continuous Speech Recognition Software System in Radiology. Journal of Digital Imagining Vol. 13 (2), Supplement 1: 211-212. May 2000.]. Subtle errors required careful proofreading to catch. Of the 84 total reports transcribed in the study, 50 had one or more subtle significant errors.

Physicians can miss subtle insertion, deletion or substitution errors. For example, the sentence "there is no evidence of atelectasis" can become "there is evidence of atelectasis" through a deletion error. This type of error changes the meaning of the report and could affect clinical care. Semantic detection would be extremely useful to avoiding a medical error.

Lai and Vergo (U.S. Pat. No. 6,006,183) created a user interface for displaying the output of speech recognition by changing the display properties for each word based on the speech recognizer's confidence scores. While this system makes it easier to spot certain types of speech recognition errors, other errors escape detection because semantic analysis is not performed. It is known that humans perform better transcription than computers because they implicitly perform domain dependent semantic analysis. Al-Aynati and Chorneyko showed correcting pathology reports dictated with speech recognition took an extra 67 minutes a week compared to human transcriptionists [Al-Aynati M M, Chorneyko K A. Comparison of voice-automated transcription and human transcription in generating pathology reports. Arch Pathol Lab Med. 2003 June 127(6):721-5]. This difference was mainly in the time to spot and correct errors.

Significant savings in time could be realized if the speech recognition system identified and classified the semantic content of each recognized sentence or sentence fragment. For example, if a radiologist were dictating a normal chest x-ray report, a semantic classifier should categorize all the report findings as normal, and display this to the user with a green color code next to each finding. Then if the speech recognition system made an error, by significantly changing the semantic content (as in the deletion error of the word "no" in the above example), the semantic classifier could generate a red color code to indicate an abnormal finding. A user would then easily spot the error by noting the incorrect color. Currently, no such semantic classifier operating in conjunction with a speech recognizer exists for a medium to large scale domain such as medicine.

Although semantic understanding could prove useful if coupled to a speech recognition system, there are several problems this approach must overcome. It is hard to build rule-based grammars for natural language. There doe not exist a complete syntactic rule base for English, and not even the best unification grammars have been created to extract all the relevant semantic knowledge in a moderately complex knowledge domain such as radiology.

Additionally, a commercially useful system with semantic understanding would need to be extensible since real world domains such as internal medicine are continually adding new knowledge. Low cost, easy to use methods for adding new concepts and linguistic expressions would be crucial to the system's design.

OBJECTS AND ADVANTAGES

The failings of the prior art are overcome by the present invention which has as its objectives the following:

An object of this invention is an advanced speech recognition system which incorporates semantic recognition of spoken utterances, and uses the semantic recognition to improve the quality of the top rated hypothesis from the speech recognizer.

Another object of this invention is a method for semantically analyzing speech in near real-time.

Another object of this invention is a speech recognition interface that indicates to a user if an utterance is part of the knowledge domain.

Another object of this invention is a speech recognition interface that characterizes the utterance according to its semantic type, for example, whether an utterance is normal or abnormal, so that a user can easily ascertain whether the speech recognizer made an error.

Another object of this invention is a method for retrieving from a domain database a similar sentence to an erroneously recognized utterance.

Another object of this invention is a method for continuously adding new utterances and semantic knowledge to the domain database and knowledge base respectively, in order to improve speech recognition results.

Another object of the invention is a speech recognition interface that displays context-specific related sentences to a spoken or written utterance in real-time.

SUMMARY OF THE INVENTION

The present invention relates to a method and speech recognition system that improves the level of confidence that a speech recognizer has accurately identified a semantically valid sentence in the knowledge domain. The top N-hypotheses are constructed by the speech recognizer and compared to a database of semantically valid domain sentences. The highest rank sentence that matches a sentence in the database is returned to the user. Semantic propositions that represent the knowledge in this sentence are retrieved from a knowledge base and returned in a different display region. If no valid sentence hypothesis is determined an indicator, such as a red color, is associated with the words from the top ranked hypothesis, and is displayed in the user interface. Various information retrieval algorithms are then used to find a close match between this hypothesis and sentences from the domain database. If the utterance is flagged as incorrect, when it is actually correct, the user can easily add it to the domain, and knowledge designers using knowledge editing tools can create new semantic entries in the knowledge base.

The present invention displays related sentences to a spoken or written utterance in real-time by using a knowledge-base of propositions that represent the meaning of the utterance.

The components of the system consist of a voice input microphone, which provides acoustic signals to the speech recognizer, a processor that translates the acoustic signal from the voice input device into sentence hypotheses using speech recognition software, and a natural language module employing a sentence database and semantic knowledge-base to select the best hypothesis from the speech recognizer and analyze it.

BRIEF DESCRIPTION OF DRAWINGS

These and other features of the Subject Invention will be better understood in relation to the Detailed Description taken in conjunction with the drawings, of which:

FIG. 4 is a bitmap rendering of a computer screen showing one embodiment of a computer interface where a sentence was unrecognized and several alternate domain specific sentences offered as corrections.

Figure 1:
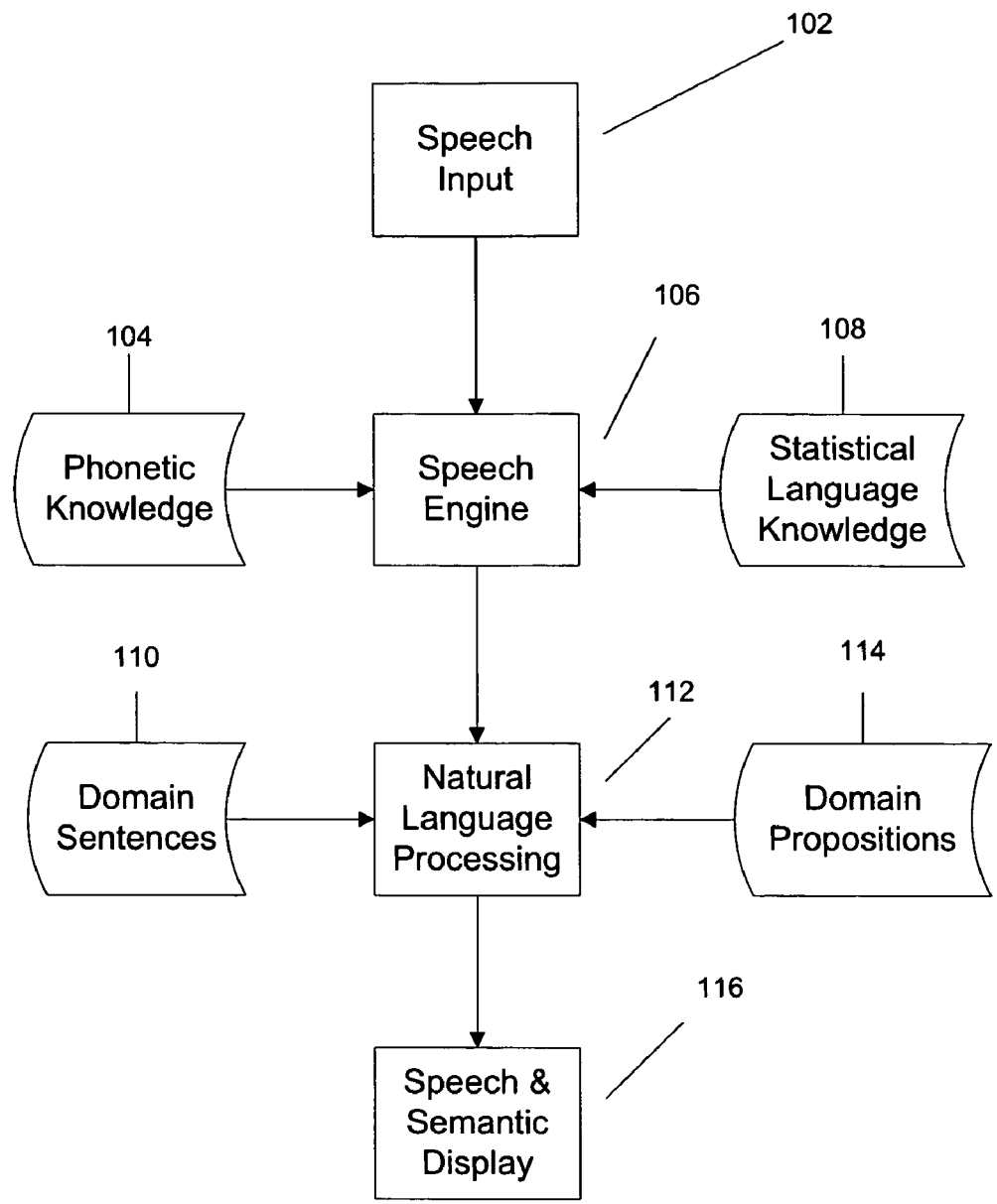
FIG. 1 is a block diagram showing the construction of an embodiment of a speech recognition and semantic processing apparatus to which the present invention is applied.

Understanding that these drawings depict only typical embodiments of the invention and are not to be construed to limit its scope, the invention will be described in detail below.

DETAILED DESCRIPTION

The present invention employs several knowledge base components described in application Ser. No. 10/844,912 titled, "Process for constructing a semantic knowledge base using a document corpus, herein referred to as "corpus based knowledge construction". Briefly, that invention describes the steps for mapping the set 5 of sentences in a corpus of related documents, to the set M, of unique meanings or propositions in a knowledge domain to form a knowledge base. A knowledge domain is the semantic knowledge contained in a large corpus of related documents from the domain, for example the semantic knowledge in 500,000 radiology reports. The fundamental unit asserted in the semantic knowledge base is a proposition expressed as a declarative sentence, conveying the underlying meaning of a document sentence. Propositions are distinct from the sentences that convey them, although they are related. For example, the sentences "The chest x-ray is normal" and "The chest x-ray is within normal limits" map to the same proposition or meaning. The knowledge-base designer creates propositions in a semi-automated fashion by drawing from common sentences in the corpus using software tools. By mapping sentence variants to the same proposition, the equivalence of different free-text sentences is accurate because strong methods of string matching are used, over weaker statistical methods. Propositions and sentence mapping are systematically performed to fully characterize the semantic knowledge of a domain. The current invention uses the semantic knowledge base, and a table that associates free-text sentences with their underlying propositions from this earlier work.

The following definitions are used to describe the invention.

| Term | Definition |
| --- | --- |
| Proposition | Atomic unit of semantic meaning capturing in whole or part the knowledge within a declarative sentence as used in propositional calculus (or sentential calculus), a formal system of logic. |
| Knowledge domain | The set of all propositions that represent the knowledge within a specialized field of study (such as radiology) |
| Corpus | A large collection of related documents (such as radiology reports). |
| Semantic Annotation | The process of taking a sentence from a document corpus and assigning one or more meanings represented by propositions in the semantic knowledge base. |
| Mapping Table | A table, usually in the form of a relational database table, which holds the links between unique sentences from the corpus to semantic proposition(s). The mapping table of the current invention is constructed by domain experts using computerized tools. |
| Validated sentence | A sentence that is found in a database of sentences derived from analyzing a corpus in a specific knowledge domain. |
| Invalid sentence | A sentence that is not found in a database of sentences derived from analyzing a corpus in a specific knowledge domain. |
| Top Hypothesis | The hypothesis returned by a speech engine to represent the written form of a given utterance said by a user. Even when a conventional speech engine returns a set of hypotheses, this is the hypothesis the user normally sees. |
| Semantic Hierarchy | A taxonomic arrangement of semantic propositions, using knowledge categories to facilitate browsing. |
| Subsumption | The arrangement of knowledge in which the most general ideas (propositions) of the knowledge domain are presented at a higher level and progressively differentiated propositions are displayed at a lower level. |

FIG. 1 shows the components of the system for recognizing utterances and semantically processing and displaying them. A human speaker talks into a microphone or other input device (102). The microphone transmits the acoustic signal to a speech engine (106). The speech engine employs a combination of hardware, typically a computer system, and specialized software to transform the acoustic signal to a digitized form and performs first-pass recognition by using algorithms well-known to those skilled in the art of speech recognition. These algorithms search phonetic (104) and language (108) models to form probabilistic hypotheses of the most likely utterance. A natural language processing component (112) performs a second-pass recognition using a database of domain sentences (110) and semantic propositions (114). The domain sentences are derived from analyzing hundreds of thousands of documents in the knowledge domain of interest. As described in corpus based knowledge construction, a unique sentence table (domain database 110) can be constructed from a corpus of related documents sorted by frequency count. Additionally, a knowledge-base designer can methodically analyze and construct a knowledge-base of propositions (domain propositions 114), which represent the semantic meaning of these sentences. The output of this second pass is displayed to the user. If the sentence is not part of the domain it is highlighted in red. If the semantic meaning of the sentence is normal a green dot is placed next to the proposition(s) which represent the meaning of the sentence, while a red dot is played next to proposition(s) that represent abnormal findings or conclusions. Those skilled in the art will appreciate that the invention may be practiced with other user interface markers or highlighting, including different colors for different semantic types or different fonts/weights including color, type, point size, bold, italics, underline, capitalization, flashing, or any combination of these features for misrecognition events.

Figure 2:
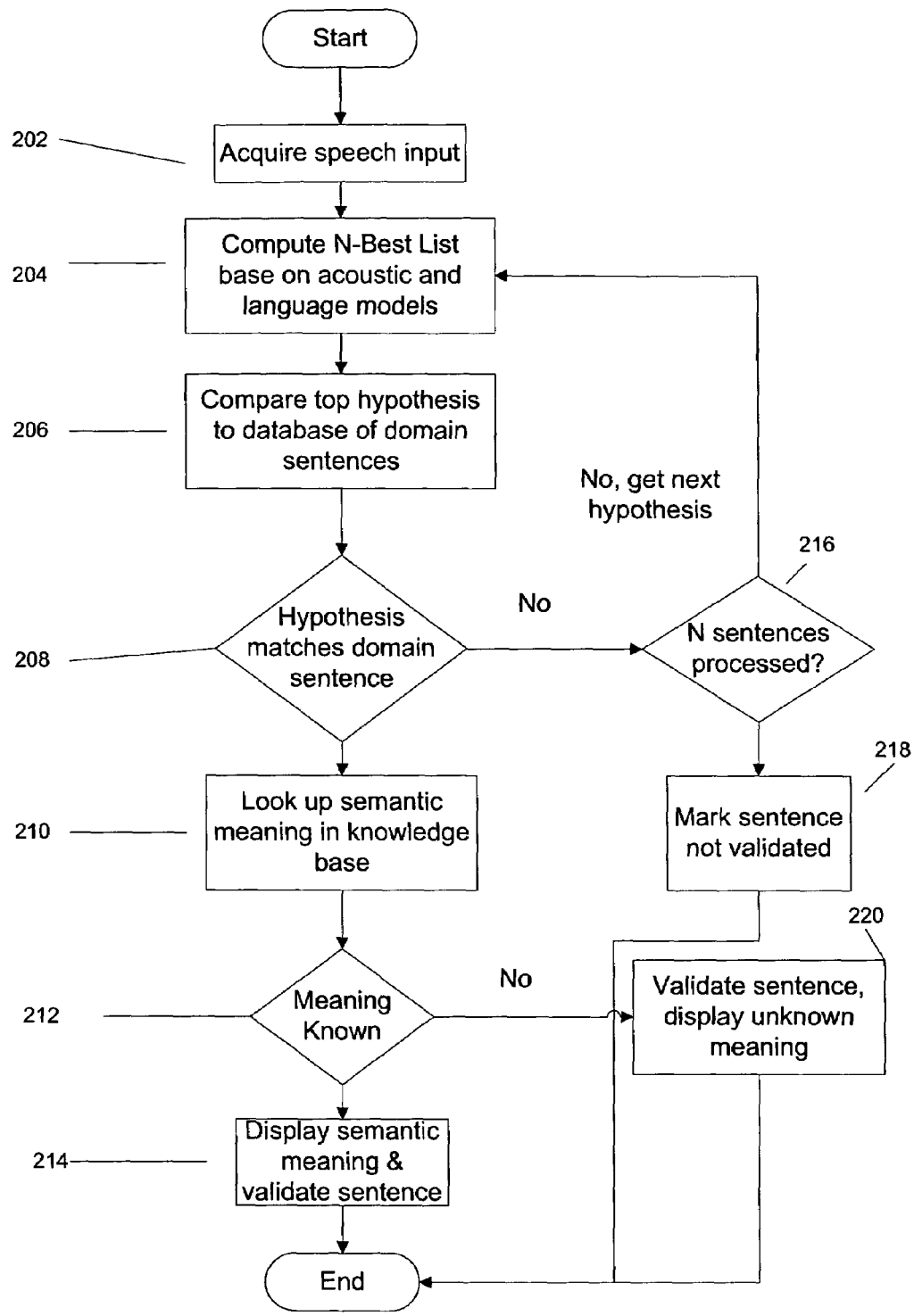
FIG. 2 is a flowchart of the operation of the components shown in FIG. 1.

FIG. 2 shows, in flow chart form, the steps which are carried out in the embodiment described in connection with FIG. 1. FIG. 2 shows that the speech signal produced by the input device (202) is fed into the speech engine (204) which contains the hardware and software to digitize the signal, decode it into words, and compute a list of hypotheses, known by those skilled in the art as the N-best hypothesis list. The top rated hypothesis is fed into the natural language processor component (206). A comparison of this hypothesis with a database of known sentences is made. Typically the sentence database would contain millions to ten of millions of sentences for a specialized knowledge domain. If an exact or close match is found excluding delimiters such as dashes, periods, or parenthesis the sentence is considered validated and is displayed through the graphic user interface (GUI). A validated sentence is said to be a part of the semantic knowledge domain. If a validated sentence is not found, the next hypothesis is tried and tested against the database, until either a validated sentence is found, or N hypotheses are tried, where N is determined by the application designer. If a validated sentence cannot be determined (218), it is invalid and displayed in a red color or marked in another unique manner.

When a validated sentence is found, a query to the semantic knowledge base constructed through the methods described in corpus based knowledge construction is performed. If one or more domain propositions are found, they are displayed in a separate region of the GUI. The application designer will employ unique colors (e.g. green for normal, red for abnormal) or other display values to indicate the semantic type (214). If no domain propositions are found the sentence is marked as unknown semantic meaning (220). This sentence can later be classified by a knowledge engineer.

Figure 3:
FIG. 3 is a bitmap rendering of a computer screen displaying one embodiment of a computer interface for the present invention.

FIG. 3 shows one embodiment of the GUI display. In this example, the user spoke the utterance "The heart and lungs are normal". The top rated hypothesis from the speech engine was also "The heart and lungs are normal". This sentence was found in the radiology domain so the sentence was validated and displayed with normal highlighting in the speech view (302). The radiology knowledge base contained two propositions that expressed the meaning of this sentence, "The heart is normal", and "The lungs are normal". Both of semantic propositions are normal in type so a green dot is placed next to them (304).

Additionally, when a domain proposition is identified, the knowledge base is queried for all other propositions that are part of compound propositions for which it participates (source code found in corpus based knowledge construction). These propositions reflect knowledge closely related to the given proposition as determined by actual language use in the knowledge domain. The related propositions are then displayed back to the user in GUI window (306). These sentences can be placed in the report by either a mouse click or voice command.

Figure 4:
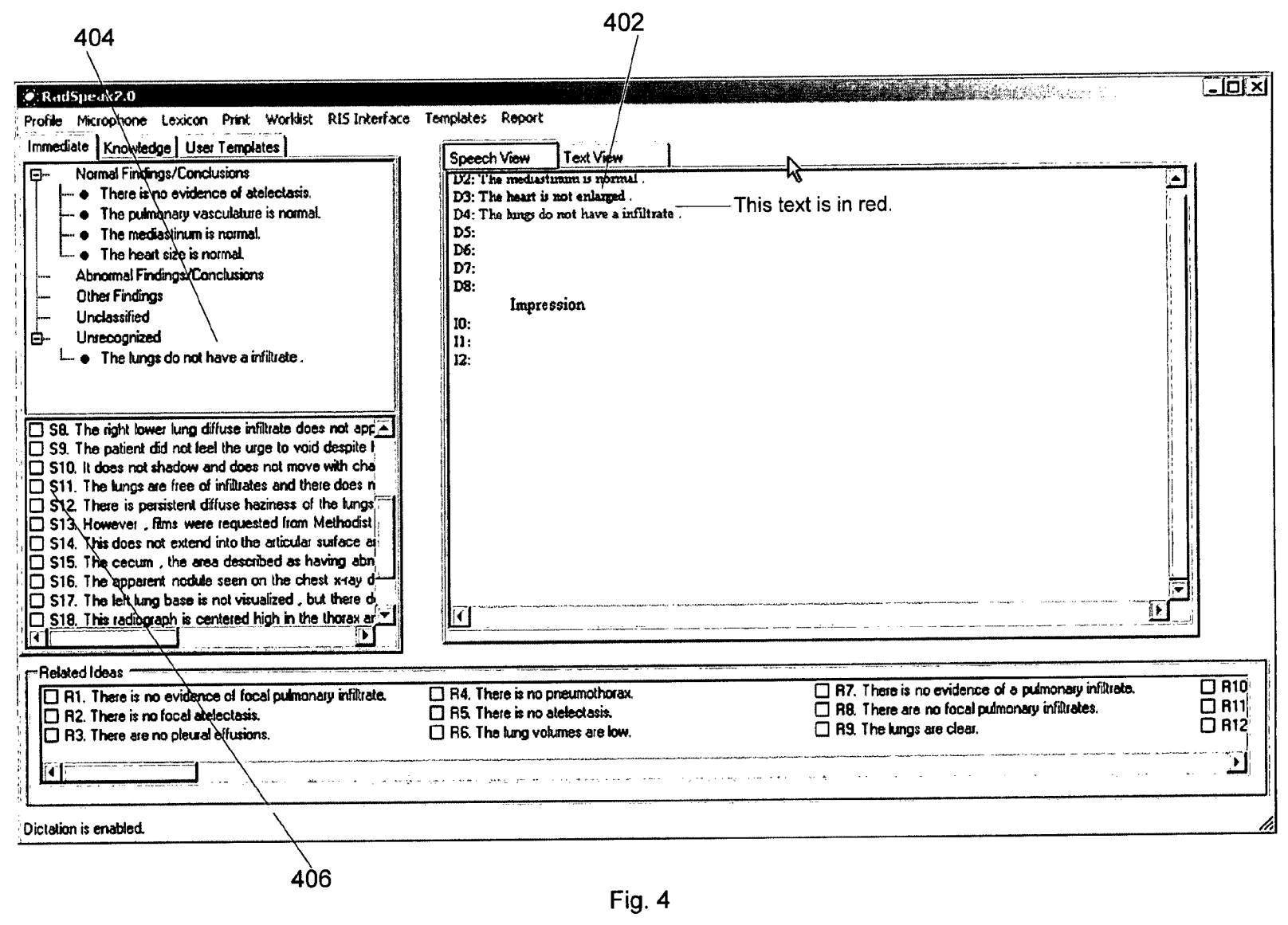

FIG. 4 shows an example of sentence that was invalid, "The lungs do not have a infiltrate". Even though many physicians would properly understand this sentence it is not grammatical and would normally not be said by radiologist in this manner. For this case the sentence is highlighted in red (402), and prominently indicated as unrecognized (404). The user can ask for corrections. Closely related domain sentences are generated by free-text search retrieval methods of sentences in the knowledge domain, readily known by those skilled in the art and returned in a list (406). These sentences can easily be substituted by either a mouse click or voice command for the unrecognized sentence. Alternatively, the sentence can be added to the domain by a user action, for example by saying "accept", and semantic analysis performed later by a knowledge engineer.

The method of the present invention can be realized in a centralized fashion in one computer system or in a distributed fashion where different elements are spread across interconnected computer systems. A typical combination of hardware and software consist of a microphone for speech input, a sound card that performs digital signal processing, a general purpose computer system employing a speech recognition engine and speech recognition application interface, database software for storing and retrieving domain sentences and knowledge, and a program that controls the computer processor using the methods described in the present invention.

DESCRIPTION AND OPERATION OF ALTERNATIVE EMBODIMENTS

The system could be used to validate and semantically characterize written sentences using a word processor. It could readily be incorporated as part of a computer application that processes spoken or written utterances as input. The semantic knowledge base could consist of first order predicate constructs instead of propositions. Using this form of knowledge representation the sentence "The heart and lungs are normal" might be represented as Appearance: (Normal heart) and Appearance: (Normal lungs). Related sentences or propositions could be retrieved based upon other criteria than participating in compound expressions. For example, if a physician dictated "Chest x-ray two views", the system might return the most common dictated lines in this type of report.

ADVANTAGES

From the description above, a number of advantages of my method for semantically recognizing, correcting, and suggesting domain specific speech become evident:

(a) The most likely uttered sentence is displayed to the user based upon both statistical word recognition and the semantic meaning for a specific knowledge domain.

(b) An out-of-domain sentence can be quickly identified thereby improving the editing speed for a document created with speech recognition.

(c) The semantic type of a sentence can be quickly displayed improving the confidence that the dictated sentence was transcribed correctly and making it easier for the user to spot errors in a given knowledge domain.

(d) For an out-of-domain sentence, a list of corrections that are in the domain can be returned using well known methods in information retrieval.

(e) The system can generate other related sentences that can be easily added to a document with either spoken command or a mouse click. This can reduce the amount of time to create a document with speech recognition.

(f) The system works in near real-time since expensive parsing operations are not needed.

(g) The system uses actual language from a knowledge domain without the need to build and maintain complex grammar and semantic rules. The database of domain sentences and propositions can be easily extended as new knowledge in the domain become available in contrast to constant re-engineering required by rule-base systems.

Although the description above contains many specifics, these should not be construed as limiting the scope of the invention but as merely providing illustrations of some of the presently preferred embodiments. Thus the scope of the invention should be determined by the appended claims and their legal equivalents, rather than by the examples given.

The invention claimed is:

1. A method for processing a spoken utterance, comprising:
   (a) obtaining an input utterance, and
   (b) performing preliminary recognition using a speech engine and,
   (c) determining if one of the hypotheses from the N-best list of said speech engine is an exact string match to an entry in a database of sentences from a knowledge domain and,
   (d) marking said matching hypothesis from said knowledge domain as validated, or failing to identify a hypothesis in said knowledge domain marking all said hypotheses as invalid.

2. The method according to claim 1 wherein a valid hypothesis is associated with a default display property for normal text.

3. The method according claim 1 wherein an invalid hypothesis is associated with a display property that provides a visual indication that distinguishes it from normal text such as a different color, font, size, highlighting, label, or any combination.

4. The method according to claim 1 to add to the database of domain sentences a new sentence using any of speech recognition, a keyboard, or pointing device, which was marked as invalid thereby changing its status to valid upon user command.

5. A method for processing a valid hypothesis from a speech engine, consisting of obtaining matching proposition (s) from a semantic knowledge base using a semantic mapping table and displaying to the user said proposition(s) or failing to identify any propositions, marking the hypothesis as semantically unrecognized for a particular knowledge domain.

6. The method according to claim 5 wherein a proposition (s) is visually associated or characterized by its semantic type with a unique color, font, size, highlighting, label, or any combination.

7. A method for obtaining related proposition(s) to a validated sentence, comprising:
   (a) consisting of obtaining matching proposition(s) from a semantic knowledge base using a semantic mapping table and,
   (b) looking up related compound sentences from said semantic mapping table which match one or more of said matching propositions and,
   (c) returning as related proposition(s) from, said semantic mapping table which match said compound sentences.

8. The method according to claim 7 of displaying these proposition(s) in a computer display window.

9. The method according to claim 7 to select related proposition(s) and place them into a document using any of speech recognition, a keyboard, or pointing device.

10. A method to retrieve from a database of domain sentences a list of closely matched sentences to an invalid sentence hypothesis produced by a speech engine.

11. The method according to claim 10 wherein one or more of the selected sentences are substituted for the invalid sentence in a document using any of speech recognition, a keyboard, or pointing device.

12. The method according to claim 1 where a newly added sentence is marked for a knowledge engineer to create semantic proposition(s).

13. The method according to claim 1 where said string match to an entry in a database of sentences from a knowledge domain exclude delimiters.

* * * * *